(12) United States Patent
Fukuda

(10) Patent No.: US 10,498,671 B2
(45) Date of Patent: Dec. 3, 2019

(54) IC CARD, PORTABLE ELECTRONIC APPARATUS, AND IC CARD PROCESSING APPARATUS

(71) Applicant: Kabushiki Kaisha Toshiba, Minato-ku (JP)

(72) Inventor: Aki Fukuda, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 49 days.

(21) Appl. No.: 15/639,877

(22) Filed: Jun. 30, 2017

(65) Prior Publication Data

US 2018/0006971 A1 Jan. 4, 2018

(30) Foreign Application Priority Data

Jul. 1, 2016 (JP) ................................. 2016-131733

(51) Int. Cl.
| | |
|---|---|
| *H04L 12/861* | (2013.01) |
| *G06F 13/38* | (2006.01) |
| *G06K 7/00* | (2006.01) |
| *G06K 19/07* | (2006.01) |
| *G06K 19/077* | (2006.01) |

(52) U.S. Cl.
CPC .......... *H04L 49/9005* (2013.01); *G06F 13/38* (2013.01); *H04L 49/9084* (2013.01); *G06K 7/0004* (2013.01); *G06K 19/0723* (2013.01); *G06K 19/0772* (2013.01)

(58) Field of Classification Search
CPC ...... G06F 13/38; G06F 13/0656; G06F 21/77; G06K 7/0004; G06K 19/07; G06K 19/0723; G06K 19/07749; G06K 19/0772; H04L 49/9005; H04L 49/9084
See application file for complete search history.

(56) References Cited

U.S. PATENT DOCUMENTS

| | | | |
|---|---|---|---|
| 4,995,056 A | 2/1991 | Fogg, Jr. et al. | |
| 5,461,217 A * | 10/1995 | Claus ................... | G06Q 20/105 235/375 |
| 5,546,549 A | 8/1996 | Barrett et al. | |

(Continued)

FOREIGN PATENT DOCUMENTS

| | | |
|---|---|---|
| EP | 0 378 401 A2 | 7/1990 |
| JP | 2005-333434 | 12/2005 |

(Continued)

OTHER PUBLICATIONS

Extended European Search Report dated Nov. 10, 2017 in European Patent Application No. 17178659.3.

*Primary Examiner* — Eric Nowlin
(74) *Attorney, Agent, or Firm* — Oblon, McClelland, Maier & Neustadt, L.L.P.

(57) ABSTRACT

An IC card has a communication unit, a storage unit, and a controller. The communication unit communicates with an external apparatus. A communication buffer for communication between the communication unit and the external apparatus is set in the storage unit. If the size of a buffer used in communication is designated by the external apparatus, the controller sets a receive buffer that stores reception data and a transmit buffer that stores transmission data in the communication buffer, and notifies the external apparatus of the size of the set receive buffer and the size of the set transmit buffer.

13 Claims, 6 Drawing Sheets

(56) References Cited

U.S. PATENT DOCUMENTS

| | | | |
|---|---|---|---|
| 5,699,532 A | 12/1997 | Barrett et al. | |
| 5,916,309 A * | 6/1999 | Brown | G06F 5/065 710/52 |
| 6,046,817 A * | 4/2000 | Brown | G06F 5/065 358/1.15 |
| 6,094,695 A * | 7/2000 | Kornher | G06F 5/065 710/56 |
| 6,463,338 B1 | 10/2002 | Neet | |
| 6,938,143 B2 * | 8/2005 | Le | G06F 5/065 710/56 |
| 7,382,793 B1 * | 6/2008 | Sindhu | H04L 41/0896 370/230 |
| 7,447,826 B2 * | 11/2008 | Seto | G06F 13/385 710/29 |
| 7,774,508 B2 | 8/2010 | Nakamura et al. | |
| 8,234,421 B2 * | 7/2012 | Leaming | G06F 13/385 710/52 |
| 8,631,255 B2 * | 1/2014 | Chew | G06F 1/3203 713/300 |
| 8,870,079 B2 * | 10/2014 | Fukuda | G06F 9/445 235/492 |
| 9,183,400 B2 * | 11/2015 | Fukuda | G06F 21/6218 |
| 9,450,751 B2 * | 9/2016 | Fukuda | H04L 9/0877 |
| 9,542,356 B2 | 1/2017 | Chew | G06F 15/167 |
| 9,929,829 B1 * | 3/2018 | Huang | H04L 47/263 |
| 2002/0178338 A1 * | 11/2002 | Shibuya | G06F 11/2056 711/173 |
| 2003/0106942 A1 * | 6/2003 | Ohya | G06F 21/77 235/492 |
| 2004/0065744 A1 * | 4/2004 | Shiraishi | G11C 16/3418 235/492 |
| 2005/0053095 A1 * | 3/2005 | Kato | G06K 7/0008 370/474 |
| 2005/0223140 A1 * | 10/2005 | Seto | G06F 13/385 710/52 |
| 2005/0240689 A1 * | 10/2005 | Leaming | G06F 13/385 710/52 |
| 2007/0145151 A1 * | 6/2007 | Nakamura | G06F 3/0613 235/492 |
| 2010/0017645 A1 * | 1/2010 | Kimoto | H04N 5/232 714/4.1 |
| 2010/0202470 A1 * | 8/2010 | Luan | H04L 47/10 370/412 |
| 2012/0234925 A1 * | 9/2012 | Fukuda | G06F 9/445 235/492 |
| 2013/0254904 A1 * | 9/2013 | Fukuda | G06F 21/6218 726/30 |
| 2014/0317715 A1 * | 10/2014 | Conner | G06K 19/0718 726/7 |
| 2015/0180804 A1 * | 6/2015 | Kim | H04L 49/9005 370/412 |
| 2015/0212795 A1 * | 7/2015 | Ilan | G06F 9/5011 711/126 |
| 2015/0261663 A1 * | 9/2015 | Dumas | G06F 12/1441 711/173 |
| 2016/0117148 A1 * | 4/2016 | Jeon | G06F 5/14 710/53 |
| 2018/0006971 A1 * | 1/2018 | Fukuda | G06F 13/38 |
| 2018/0183733 A1 * | 6/2018 | Dcruz | H04L 49/9005 |

FOREIGN PATENT DOCUMENTS

| | | |
|---|---|---|
| JP | 2012-88867 | 5/2012 |
| JP | 2016-81117 | 5/2016 |
| WO | WO 2005/057400 A1 | 6/2005 |

* cited by examiner

US 10,498,671 B2

IC CARD, PORTABLE ELECTRONIC APPARATUS, AND IC CARD PROCESSING APPARATUS

CROSS-REFERENCE TO RELATED APPLICATION

This application is based upon and claims the benefit of priority from Japanese Patent Application No. 2016-131733, filed on Jul. 1, 2016, the entire contents of which are incorporated herein by reference.

FIELD

Embodiments of the present invention relate to an IC card, a portable electronic apparatus, and an IC card processing apparatus.

BACKGROUND

Conventionally, an IC card performs data communication with an IC card processing apparatus using a communication buffer provided on a working memory, and if the IC card transmits or receives data having a size that exceeds the size of the communication buffer, the IC card needs to perform control such as dividing the data.

For example, if the length of a response APDU is longer than the buffer size of a communication protocol in secure messaging processing, a conventional IC card divides data such that the length of the response APDU does not exceed the buffer size, or responds with the response APDU that exceeds the buffer size. This selection depends on the implementation of individual IC cards, and thus the conventional IC card sometimes has a problem in compatibility of communication with the IC card processing apparatus. Also, there is a limitation on the size of a memory of the IC card, and thus there is also a problem in that the buffer size cannot be extended easily.

DETAILED DESCRIPTION

According to an embodiment, an IC card has a communication unit, a storage unit, and a controller. The communication unit communicates with an external apparatus. A communication buffer for communication between the communication unit and the external apparatus is set in the storage unit. If the size of a buffer used in communication is designated by the external apparatus, the controller sets a receive buffer that stores reception data and a transmit buffer that stores transmission data in the communication buffer, and notifies the external apparatus of the size of the set receive buffer and the size of the set transmit buffer.

The following is the description of embodiments, with reference to the accompanying drawings.

Figure 1:
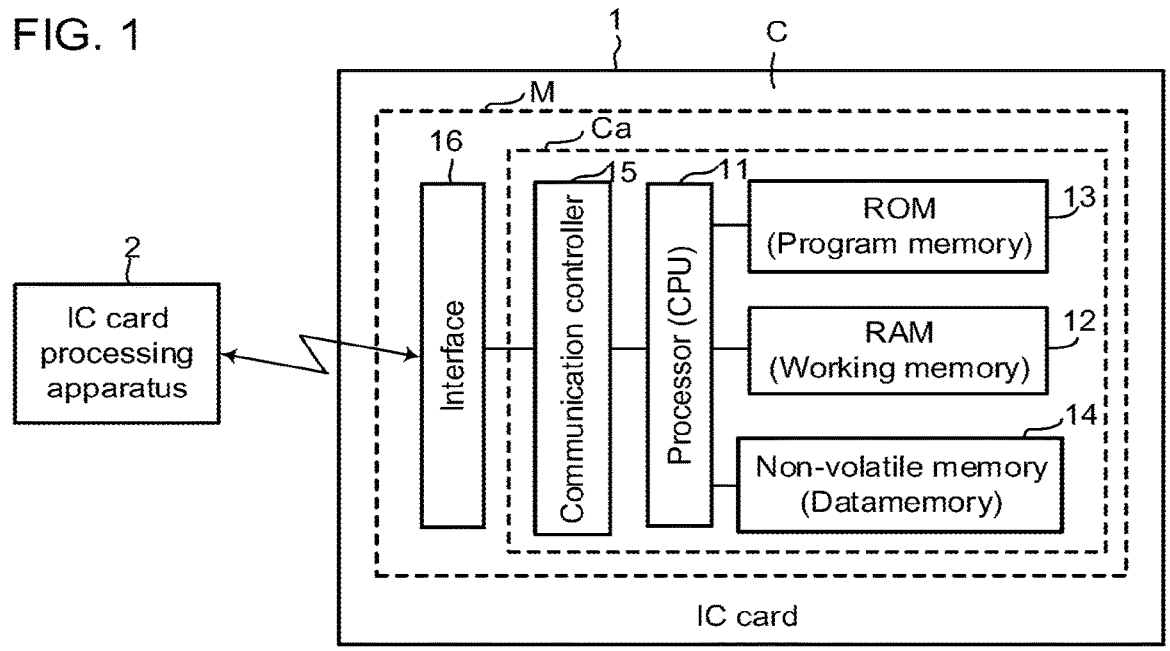
FIG. 1 is a diagram showing a configuration example of an IC card according to an embodiment.

FIG. 1 is a block diagram schematically showing a configuration example of an IC card 1 according to an embodiment.

The IC card 1 according to the embodiment together with an IC card processing apparatus 2 constitutes an IC card processing system. The IC card 1 is a portable electronic device that is activated (made to be operational) by power supplied from the IC card processing apparatus 2. The IC card 1 is also called a smart card. IC cards 1 are broadly divided into contact type IC cards (contact IC cards) and contactless type IC cards (contactless IC cards). For example, a contact IC card 1 is activated by being supplied with operating power and an operating clock signal from the IC card processing apparatus 2 via a contact unit serving as a communication interface. A contactless IC card 1 is activated by receiving a radio wave from the IC card processing apparatus 2 via an antenna serving as the communication interface, a modulation and demodulation circuit, and the like, and generating operating power and an operating clock signal from that radio wave.

As shown in FIG. 1, the IC card 1 has a main body C. The main body C is made of plastic or the like and formed into a card shape. The IC card 1 has a module M within the main body C. In the module M, one or more IC chips Ca and an external interface (interface) for communication are integrally formed in a connected state. The module M is embedded in the main body C. Moreover, as shown in FIG. 1, the module M of the IC card 1 has a processor 11, a RAM 12, a ROM 13, a nonvolatile memory 14, a communication controller 15, an interface 16, and the like.

The processor 11 includes a circuit that performs various types of processing. The processor 11 may be a CPU (Central Processing Unit), for example. The processor 11 performs overall control of the IC card 1. The processor 11 realizes various processing functions by executing programs stored in the ROM 13 or the nonvolatile memory 14. However, at least one or all of the various functions executed by the processor 11, which will be described later, may also be realized by a hardware circuit.

The RAM 12 is a volatile memory that functions as a working memory. The RAM 12 also functions as a buffer that temporarily stores data and the like undergoing processing by the processor 11. For example, the RAM 12 is provided with a communication buffer (transmit/receive buffer) that temporarily stores data to be transmitted to and received from the IC card processing apparatus 2 via the communication controller 15 and the interface 16. The communication buffer provided in the RAM 12 is constituted by a transmit buffer that stores data to be transmitted and a receive buffer that stores reception data. Moreover, the RAM 12 also stores various types of control information for defining the communication buffer.

The ROM 13 is a nonvolatile memory that functions as a program memory. Control programs, control data, and the like are preliminarily stored in the ROM 13. The ROM 13 is incorporated into the IC card 1 at the manufacturing stage in a state in which the control programs, the control data, and the like are stored therein. That is to say, the control programs and the control data stored in the ROM 13 are preliminarily incorporated in accordance with the specifications of the IC card 1. For example, the ROM 13 stores a program for the processor 11 to execute processing corresponding to a command received from the IC card processing apparatus 2.

The nonvolatile memory 14 is a nonvolatile memory to which data can be written and rewritten. The nonvolatile memory 14 is configured by, for example, an EEPROM (registered trademark) (Electrically Erasable Programmable Read Only Memory), a flash ROM, or the like. Programs corresponding to an operation purpose of the IC card 1 and various types of data are written to the nonvolatile memory 14. Moreover, a portion or the entirety of the region of the nonvolatile memory 14 is tamper-resistant, and data can be securely stored therein. In the nonvolatile memory 14, program files, data files, or the like are defined, and control programs and various types of setting data are written into those files. For example, the nonvolatile memory 14 stores various setting data for communication control, user data, application programs, and the like.

The communication controller 15 is connected to the interface 16. The interface 16 is an interface for communicatively connecting to the external apparatus. The communication controller 15 and the interface 16 constitute a communication unit. The communication controller 15 and the interface 16 realize a communication function that uses a communication method corresponding to an interface of the IC card processing apparatus 2. Moreover, the communication controller 15 and the interface 16 may also be configured to support a plurality of communication methods (e.g., contact communication and contactless communication).

In the case where the IC card 1 is realized as a contact IC card, the communication controller 15 and the interface 16 constitute a communication unit that communicates with the IC card processing apparatus 2 through contact therewith. In this case, the interface 16 is constituted by a contact unit that can be brought into physical and electrical contact with a contact unit of the IC card processing apparatus 2, and the communication controller 15 is constituted by a circuit or the like that controls transmission and reception of signals via the contact unit.

In the case where the IC card 1 is realized as a contactless IC card, the communication controller 15 and the interface 16 constitute a communication unit that communicates with a card reader/writer of the IC card processing apparatus 2 in a contactless (wireless) manner. In this case, the interface 16 is constituted by an antenna that can transmit and receive radio waves, and the communication controller 15 is constituted by a modulation circuit for generating a radio wave to be transmitted, a demodulation circuit for generating a signal from a received radio wave, and the like.

Figure 2:
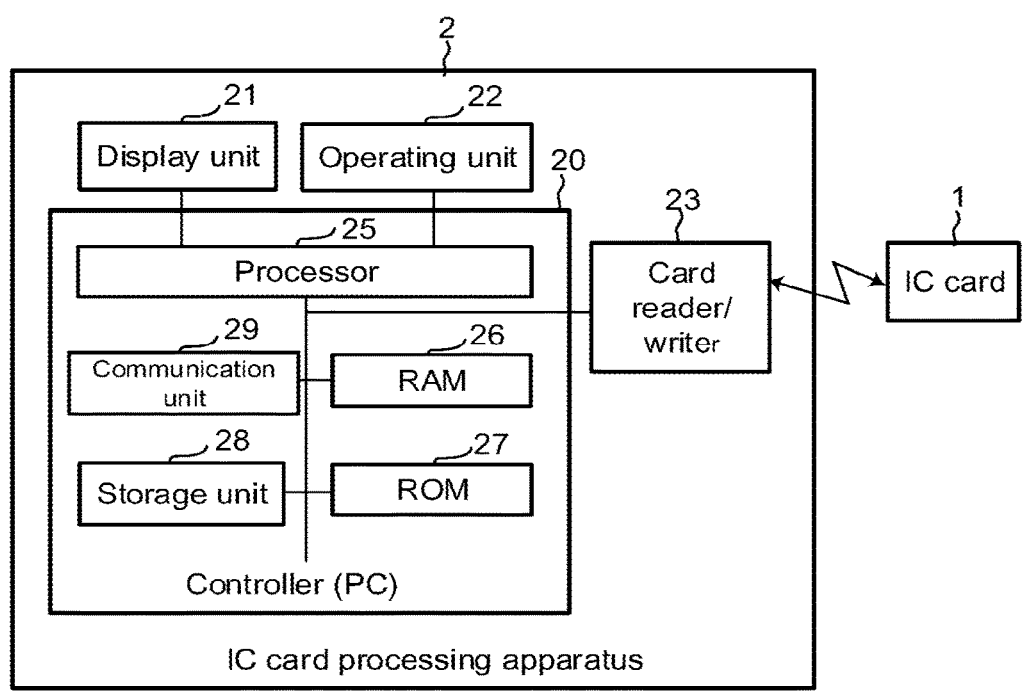
FIG. 2 is a diagram showing a configuration example of an IC card processing apparatus according to the embodiment.

FIG. 2 is a block diagram schematically showing a configuration example of an IC card processing apparatus 2 according to the embodiment.

In the configuration example shown in FIG. 2, the IC card processing apparatus 2 of the IC card processing system is a host device having a function of communicating with the IC card 1 via the card reader/writer. The IC card processing apparatus 2 is assumed to be an apparatus in which the card reader/writer is connected to a control apparatus such as a personal computer (PC), for example.

As shown in FIG. 2, the IC card processing apparatus 2 has a controller 21, a display unit 22, an operating unit 23, a card reader/writer 24, and the like.

The controller 21 controls the overall operation of the IC card processing apparatus 2. The controller 21 is constituted by a processor (CPU) 25, a RAM 26, a ROM 27, a nonvolatile memory 28, a communication unit 29, and the like. For example, the controller 21 is constituted by a personal computer (PC). The processor 25 executes various types of processing by executing programs stored in the ROM 27 or the nonvolatile memory 28. The RAM 26 functions as a working memory that temporarily stores data. The ROM 27 is a nonvolatile memory that stores programs, control data, and the like. The nonvolatile memory 28 is a rewritable nonvolatile memory. The communication unit 29 is an interface for communicating with an external apparatus.

The controller 21 has the function of transmitting commands to the IC card 1 via the card reader/writer 24, the function of performing various types of processing based on data received from the IC card 1, and other functions. For example, the controller 21 performs control to write data to the nonvolatile memory in the IC card 1 by transmitting a data write command to the IC card 1 via the card reader/writer 24. Also, the controller 21 performs control to read data from the IC card 1 by transmitting a read command to the IC card 1. Also, the controller 21 has the function of executing a plurality of applications.

The display unit 22 is a display apparatus that displays various types of information under the control of the controller 21. The operating unit 23 is constituted by a keyboard, a numeric keypad, a pointing device, and the like. The operating unit 23 is a unit for allowing an operator of the IC card processing apparatus 2 to input various operating instructions, data, and the like. The operating unit 23 also functions as an input unit for inputting identification information of a user of the IC card 1, authentication information such as a password, and the like.

The card reader/writer 24 is an interface apparatus for communicating with the IC card 1. The card reader/writer 24 is configured by an interface corresponding to the communication method of the IC card 1. For example, in the case where the IC card 1 is a contact type IC card, the card reader/writer 24 is constituted by a contact unit for physically and electrically connecting to the contact unit of the IC card 1, and the like. In the case where the IC card 1 is a contactless type IC card, the card reader/writer 24 is constituted by an antenna for performing wireless communication with the IC card 1, a communication controller, and the like. The card reader/writer 24 supplies power and a clock signal to the IC card 1, performs reset control of the IC card 1, and transmits and receives data to and from the IC card 1. Based on the control by the controller 21, the card reader/writer 24 activates (starts up) the IC card 1, transmits various commands, receives responses to the transmitted commands, and so on.

Next, a configuration example of data in the RAM 12 of the IC card 1 according to the present embodiment will be described.

Figure 3:
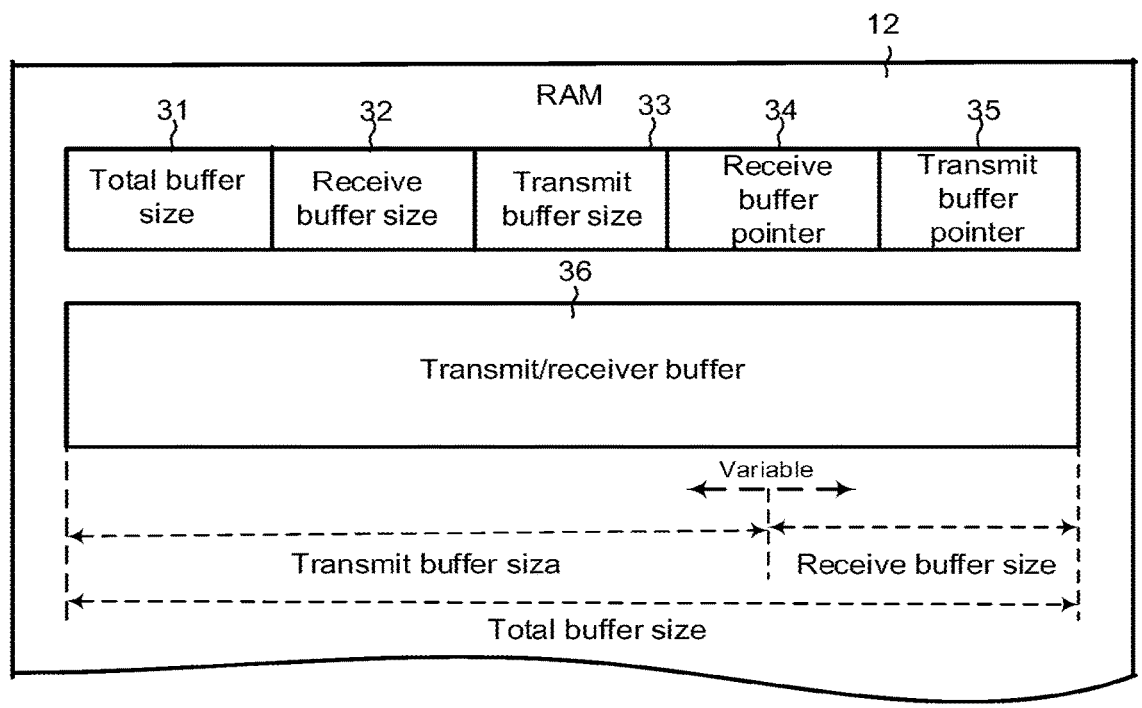
FIG. 3 is a diagram showing a configuration example of data in a RAM 12 of an IC card 1 according to the embodiment.

FIG. 3 is a diagram showing a configuration example of a storage region for storing various types of data in the RAM 12.

The RAM 12 of the IC card 1 is provided with regions 31 to 35 for storing various types of setting information and a transmit/receive buffer (communication buffer) 36 as the storage regions used for controlling data communication. In the configuration example shown in FIG. 3, the region 31 is a storage region that stores information indicating the size (total buffer size) of the communication buffer (transmit/receive buffer) constituted by a receive buffer and a transmit, buffer. The region 32 is a storage region that stores information indicating the size of the receive buffer (receive buffer size). The region 33 is a storage region that stores information indicating the size of the transmit buffer (transmit buffer size). The region 34 is a storage region that stores a receive buffer pointer, which is the start address of the receive buffer in the memory region of the RAM 12. The region 35 is a storage region that stores a transmit buffer pointer, which is the start address of the transmit buffer in the memory region of the RAM 12.

The transmit/receive buffer 36 is a storage region used as the transmit buffer and the receive buffer in the memory region of the RAM 12. In the configuration example shown in FIG. 3, the transmit/receive buffer is constituted by a storage region in which the transmit buffer and the receive buffer are continuous. In the transmit/receive buffer, a region having the transmit buffer size is secured as the transmit buffer, and a region having the receive buffer size is secured as the receive buffer. The size of the overall transmit/receive buffer (total buffer size) is fixed at a size that has been set. The size of the transmit buffer and the size of the receive buffer are variable in the transmit/receive buffer even after the total buffer size has been set.

Next, a configuration example of data in the nonvolatile memory 14 of the IC card 1 according to the present embodiment will be described.

Figure 4:
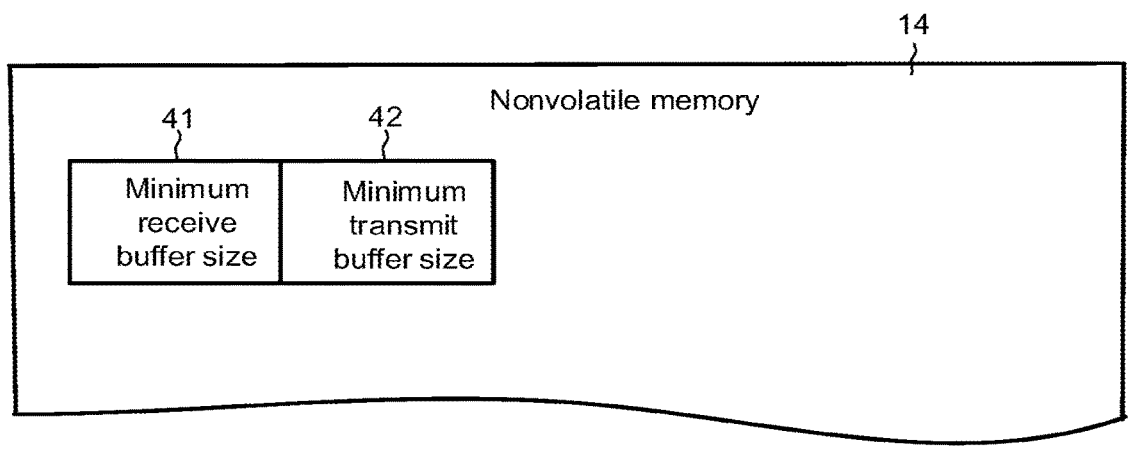
FIG. 4 is a diagram showing an example of setting data stored in a nonvolatile memory of the IC card according to the embodiment.

FIG. 4 is a diagram showing an example of storing setting data in the nonvolatile memory 14 of the IC card 1.

In the configuration example shown in FIG. 4, the nonvolatile memory 14 is provided with regions 41 and 42 that store setting data relating to the transmit buffer and the receive buffer. The region 41 is a storage region that stores information indicating the minimum receive buffer size. The minimum receive buffer size is a setting value that indicates the minimum size that can be set as the receive buffer, and the receive buffer is set to have a size that is greater than or equal to the minimum receive buffer size. For example, this means that when the size of the receive buffer is changed, the size of the receive buffer cannot be changed to a value that is smaller than the minimum receive buffer size. The region 42 is a storage region that stores information indicating the minimum transmit buffer size. The minimum transmit buffer size is a setting value that indicates the minimum size that can be set as the transmit buffer, and the size of the transmit buffer is secured to be greater than or equal to the minimum receive buffer size. For example, this means that when the transmit buffer size is changed, the size of the transmit buffer cannot be changed to a value that is smaller than the minimum transmit buffer size.

Next, transmit buffer and receive buffer setting processing in initial response or anti-collision as a communication control between the IC card and the IC card processing apparatus will be described.

First, initial response processing in the case where the IC card 1 is a contact IC card will be described schematically.

Figure 5:
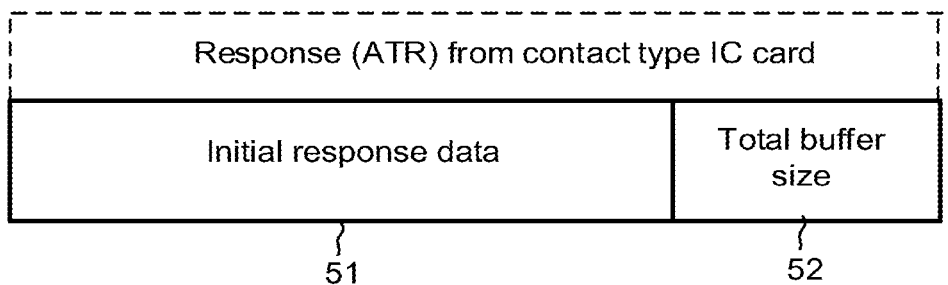
FIG. 5 is a diagram showing a configuration example of data that is transmitted as an initial response to the IC card processing apparatus by the IC card according to the embodiment.

FIG. 5 is a diagram showing a configuration example of data that is transmitted as an initial response (ATR) to the IC card processing apparatus 2 by the IC card 1 serving as the contact IC card.

As shown in FIG. 5, the contact IC card 1 transmits response data having a first data portion 51 and a second data portion 52 to the IC card processing apparatus 2 in the initial response. The first data portion 51 stores initial response data, and the second data portion 52 stores data indicating the total buffer size. The total buffer size is information indicating the size of the transmit/receive buffer that is provided by the IC card 1 in the RAM 12. The transmit/receive buffer is set in the RAM 12 at a fixed size in the initial setting of the IC card 1, and thus the total buffer size is a fixed value in a series of communication processing.

Figure 6:
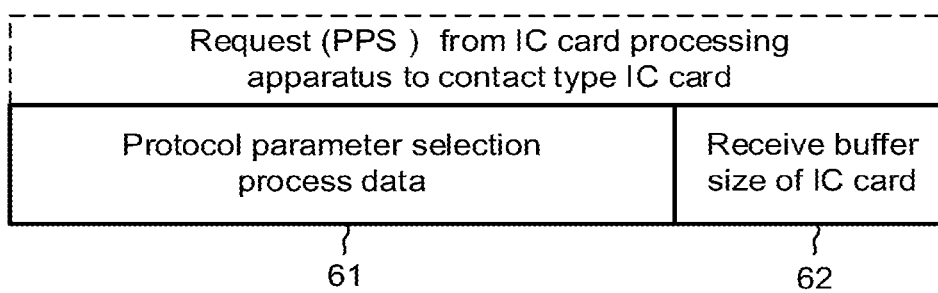
FIG. 6 is a diagram showing a configuration example of request data that is transmitted to the IC card by the IC card processing apparatus according to the embodiment.

FIG. 6 is a diagram showing a configuration example of a request (PPS) from the IC card processing apparatus 2 to the contact IC card 1.

After the IC card processing apparatus 2 receives the initial response from the contact IC card 1, the IC card processing apparatus 2 requests the contact IC card 1, which has transmitted the initial response, to perform protocol parameter selection processing. In the configuration example shown in FIG. 6, the IC card processing apparatus 2 transmits the request data including the first data portion 61 and the second data portion 62 to the IC card 1. The first data portion 61 stores protocol parameter selection processing data, and the second data portion 62 stores data indicating the receive buffer size of the IC card. The protocol parameter selection processing data indicates the protocol parameter selection processing that the IC card 1 is requested to perform. The receive buffer size indicates the size of the receive buffer that the IC card 1 is requested (designated) to use.

For example, the IC card processing apparatus 2 determines the size of the receive buffer that the IC card 1 is requested, based on the total buffer size in the initial response received from the contact IC card 1 and the size of data that is to be transmitted, and transmits the request data including the determined receive buffer size to the IC card 1.

Figure 7:
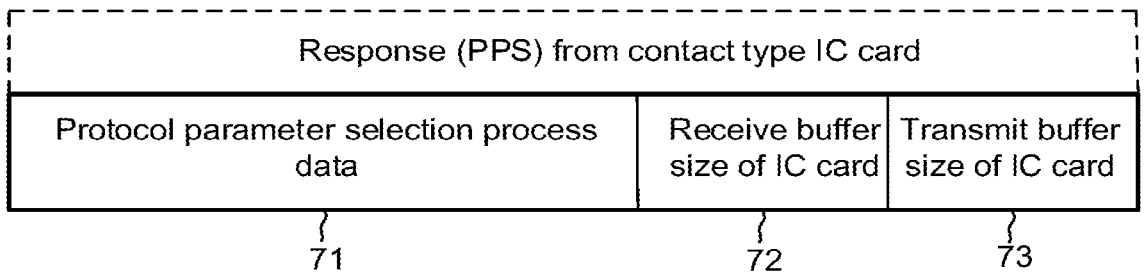
FIG. 7 is a diagram showing an example of response data that is transmitted to the IC card processing apparatus from the IC card 1 according to the embodiment.

FIG. 7 is a diagram showing an example of a response (PPS) given by the contact IC card 1 to the request from the IC card processing apparatus 2.

When the contact IC card 1 receives the designation of the receive buffer size from the IC card processing apparatus 2, the contact IC card 1 sets the receive buffer and the transmit buffer in the transmit/receive buffer, and transmits response data indicating the setting result to the IC card processing apparatus 2. FIG. 7 shows a configuration example of response data including a first data portion 71, a second data portion 72, and a third data portion 73 as the response (PPS) given by the contact IC card 1 to the IC card processing apparatus 2. The first data portion 71 stores the protocol parameter selection processing data, the second data portion 72 stores data indicating the receive buffer size of the IC card, and the third data portion 73 stores data indicating the transmit buffer size of the IC card.

The protocol parameter selection processing data indicates the result of executing the protocol parameter selection processing requested by the IC card processing apparatus 2. The receive buffer size indicates the size of the receive buffer that the IC card 1 sets in the transmit/receive buffer 36. The transmit buffer size indicates the size of the transmit buffer that the IC card 1 sets in the transmit/receive buffer 36.

For example, the IC card 1 sets the receive buffer and the transmit buffer in the transmit/receive buffer 36 based on the receive buffer size requested by the IC card processing apparatus 2 while considering the total buffer size, the minimum receive buffer size, and the minimum transmit buffer size. The receive buffer and transmit buffer setting processing in the IC card 1 will be described in detail later. Upon setting the receive buffer and the transmit buffer, the IC card 1 transmits, to the IC card processing apparatus 2, response data in which the set receive buffer size and transmit buffer size are set.

Next, anti-collision processing in the case where the IC card 1 is a contactless IC card will be described schematically.

Figure 8:
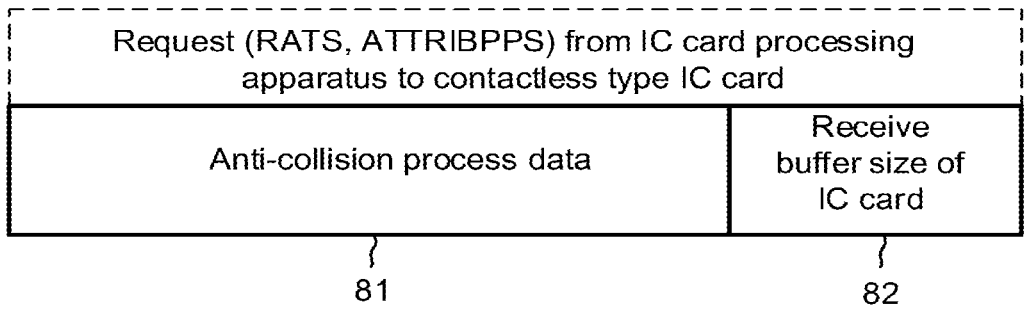
FIG. 8 is a diagram showing a configuration example of request data that is transmitted to the IC card 1 in anti-collision processing by an IC card processing apparatus 2 according to the embodiment.

FIG. 8 is a diagram showing a configuration example of data (RATS, ATTRIB) for the IC card processing apparatus 2 to make requests to the IC card 1 serving as the contactless IC card in the anti-collision processing.

In the present embodiment, the IC card processing apparatus 2 designates the receive buffer size to the contactless IC card 1 in the anti-collision processing with the IC card 1. In the configuration example shown in FIG. 8, the IC card processing apparatus 2 transmits, to the IC card 1, data including a first data portion 81 and a second data portion 82 in RATS or ATTRIB in the anti-collision processing. The first data portion 81 stores anti-collision processing data, and the second data portion 82 stores data indicating the receive buffer size of the IC card. The anti-collision processing data indicates the anti-collision processing that the IC card processing apparatus 2 requests the IC card 1 to perform. The receive buffer size indicates the size of the receive buffer that the IC card processing apparatus 2 requests the IC card 1 to set.

Figure 9:
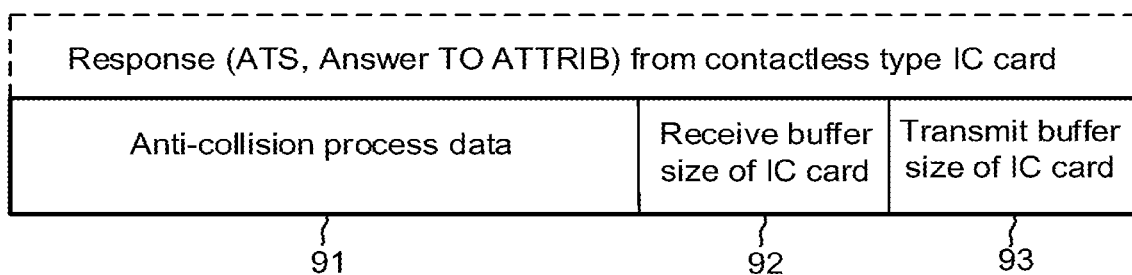
FIG. 9 is a diagram showing an example of response data that is transmitted to the IC card processing apparatus from the IC card according to the embodiment.

FIG. 9 is a diagram showing an example of a response (ATS, Answer to ATTRIB) from the contactless IC card 1 to the request made by the IC card processing apparatus 2.

When the contactless IC card 1 receives the designation of the receive buffer size from the IC card processing apparatus 2, the contactless IC card 1 performs the receive buffer and transmit buffer setting processing in the transmit/receive buffer, and transmits a response indicating the setting result to the IC card processing apparatus 2. FIG. 9 shows a configuration example of data including a first data portion 91, a second data portion 92, and a third data portion 93 as the response data (ATS, Answer to ATTRIB) that is transmitted by the IC card 1 to the IC card processing apparatus 2 in the anti-collision processing. The first data portion 91 stores the anti-collision processing data, the second data portion 92 stores data indicating the receive buffer size of the IC card, and the third data portion 93 stores data indicating the transmit buffer size of the IC card.

The anti-collision processing data indicates the result of executing the anti-collision processing requested by the IC card processing apparatus 2. The receive buffer size indicates the size of the receive buffer that the IC card 1 sets in the transmit/receive buffer 36. The transmit buffer size indicates the size of the transmit buffer that the IC card 1 sets in the transmit/receive buffer 36.

For example, the IC card 1 sets the receive buffer and the transmit buffer in the transmit/receive buffer 36 based on the receive buffer size requested by the IC card processing apparatus 2 while considering the total buffer size, the minimum receive buffer size, and the minimum transmit buffer size. The receive buffer and transmit buffer setting processing in the IC card 1 will be described in detail later. Upon setting the receive buffer and the transmit buffer, the IC card 1 transmits, to the IC card processing apparatus 2, response data in which the set receive buffer size and transmit buffer size are set.

Next, buffer size change processing during the execution of an application in the IC card 1 according to an embodiment will be described schematically.

First, a configuration example of a buffer size change command given to the IC card 1 according to the embodiment will be described.

Figure 10:
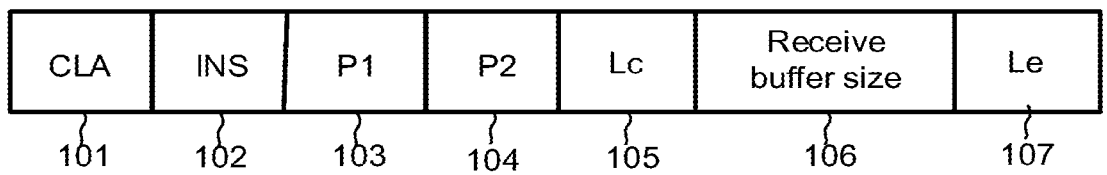
FIG. 10 is a diagram showing a configuration example of a buffer size change command that is given to the IC card 1 according to the embodiment.

FIG. 10 is a diagram showing a configuration example of the buffer size change command.

The command shown in FIG. 10 has a configuration conforming to the format of a command defined in a general standard (for example, ISO/IEC 7816) used in processing of the IC card 1. In the example shown in FIG. 10, the buffer size change command is constituted by the format in which a CLA 101, an INS 102, a P1 (103), a P2 (104), an Lc 105, a data portion 106, and an Le 107 are arranged in order.

The CLA 101 and the INS 102 are information indicating a command (for example, a command code). The information indicating a command indicates the content of processing to be executed, and is preliminarily determined by a standard or the like. In the present embodiment, the buffer size change command is information indicating that the CLA 101 and the INS 102 are commands for requesting the changing of the buffer size. That is, when the IC card processing apparatus 2 requests the IC card 1 to change the receive buffer size, the IC card processing apparatus 2 generates a command in which information indicating the buffer size change command is set in the CLA and the INS.

The P1 (103) and the P2 (104) are parameters for this command. For example, information indicating security settings for the response is set in the P1 and the P2. The Lc 105 is information indicating the length of data in this command. The data portion 106 stores data that is in the command. In the buffer size change command shown in FIG. 10, the data portion 106 stores data indicating the size of the receive buffer that the IC card processing apparatus 2 requests (designates) the IC card 1 to set. The Le 107 stores information indicating the length of data of the response to this command.

Figure 11:
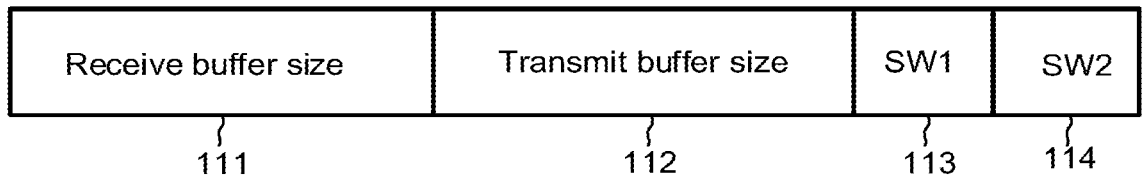
FIG. 11 is a diagram showing a configuration example of response data that is transmitted to the IC card processing apparatus in response to the buffer size change command by the IC card according to the embodiment.

FIG. 11 is a diagram showing a configuration example of response data that is transmitted by the IC card 1 to the IC card processing apparatus 2 as the response to the buffer size change command.

As shown in FIG. 11, the data on the response to the buffer size change command has a first data portion 111, a second data portion 112, an SW1 (113), and an SW2 (114). The SW1 (113) and the SW2 (114) are information (status words) indicating the result of performing processing on the command. For example, the SW1 (113) and the SW2 (114) are information indicating that the command was processed normally, or information indicating that an error occurred in processing the command.

The first data portion 111 and the second data portion 112 are data portions that store data obtained as the result of performing processing on a command. The configuration example shown in FIG. 10 shows that a data portion of the data of the response to the buffer size change command includes the first data portion 111 and the second data portion 112. FIG. 10 also shows that the first data portion 111 stores data indicating the receive buffer size, and the second data portion 112 stores data indicating the transmit buffer size.

Next, buffer size change processing (receive buffer and transmit buffer setting processing) in the IC card 1 according to the embodiment will be described.

Figure 12:
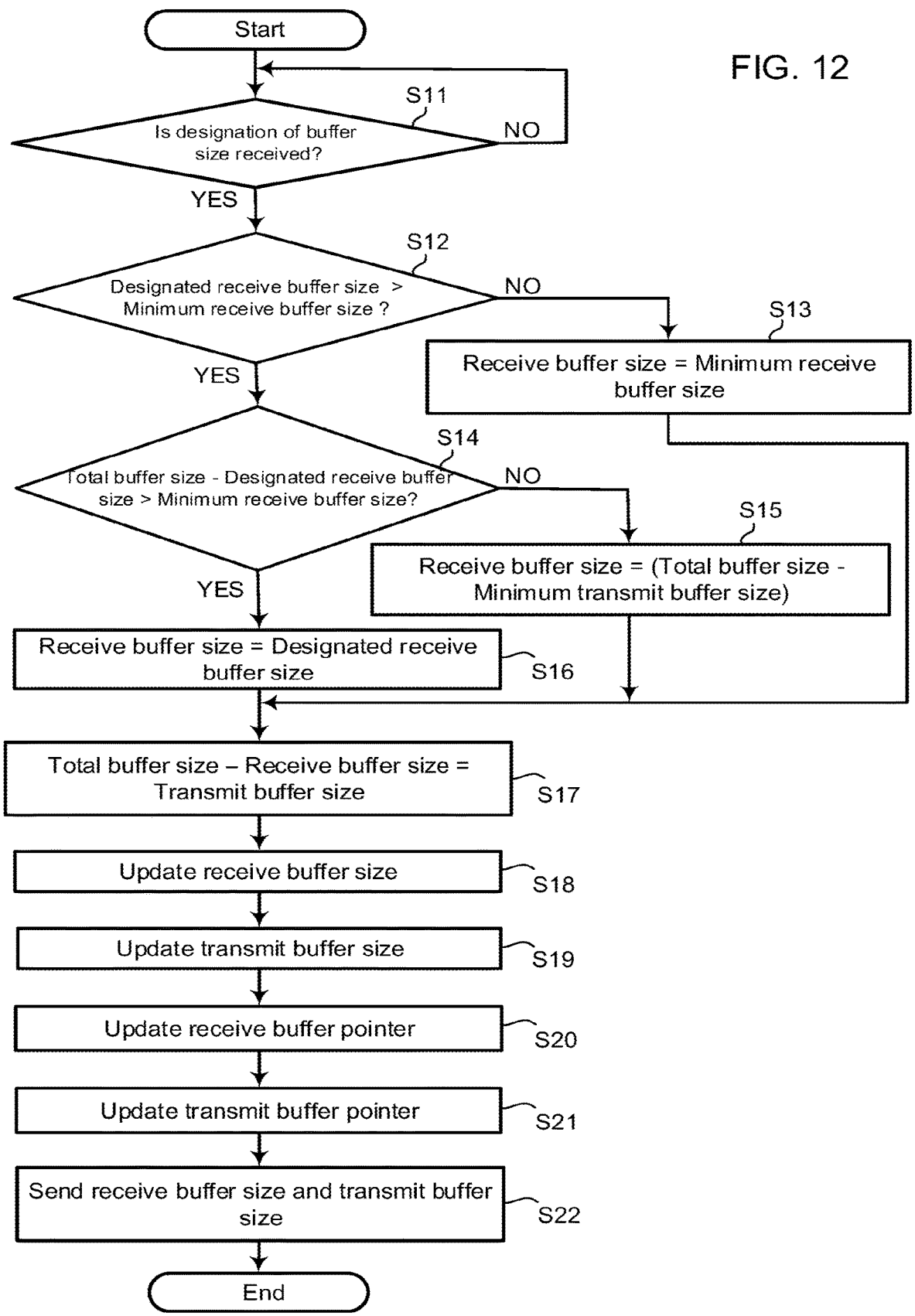
FIG. 12 is a flowchart for illustrating the flow of buffer size change processing in the IC card according to the embodiment.

FIG. 12 shows a flowchart for illustrating the flow of the buffer size changing processing (receive buffer and transmit buffer setting processing) in the IC card 1.

The IC card 1 accepts the designation of the buffer size from the IC card processing apparatus 2. For example, if the IC card 1 is a contact IC card, the IC card 1 accepts the designation of the buffer size (receive buffer size) by a request from the IC card processing apparatus 2 (for example, see FIG. 6) in the initial response processing. If the IC card 1 is a contactless IC card, the IC card 1 accepts the designation of the buffer size (receive buffer size) by a request from the IC card processing apparatus 2 (for example, see FIG. 8) in the anti-collision processing. Also, during the execution of an application, the IC card 1 accepts the designation of the buffer size (receive buffer size) from the IC card processing apparatus 2 by a buffer size change command (for example, see FIG. 10).

Upon receiving the designation of the buffer size from the IC card processing apparatus 2 (step S11, YES), the processor 11 of the IC card 1 determines whether the size designated of the receive buffer (referred to as "designated receive buffer size") is greater than the minimum receive buffer size (step S12). If it is determined that the designated receive buffer size is less than or equal to the minimum receive buffer size (step S12, NO), the processor 11 determines the receive buffer size in the transmit/receive buffer 36 in the RAM 12 to be the minimum receive buffer size (step S13).

Also, if it is determined that the designated receive buffer size is greater than the minimum receive buffer size (step S12, YES), the processor 11 determines whether the size obtained by subtracting the designated receive buffer size from the total buffer size is greater than the minimum transmit buffer size (step S14). In the IC card 1 according to the present embodiment, the transmit/receive buffer (communication buffer) 36 is divided into the receive buffer and the transmit buffer. Thus, if the size obtained by subtracting the designated receive buffer size from the total buffer size is less than or equal to the minimum transmit buffer size, the transmit buffer size needs to be set to the minimum transmit buffer size.

That is, if it is determined that the size obtained by subtracting the designated receive buffer size from the total buffer size is less than or equal to the minimum transmit buffer size (step S14, NO), the processor 11 determines the receive buffer size in the transmit/receive buffer 36 in the RAM 12 to be the size obtained by subtracting the minimum transmit buffer size from the total buffer size (step S15).

Moreover, if it is determined that the size obtained by subtracting the designated receive buffer size from the total buffer size is greater than the minimum transmit buffer size (step S14, YES), the processor 11 determines the receive buffer size in the transmit/receive buffer 36 in the RAM 12 to be the designated receive buffer size (step S16).

When the receive buffer size is determined (step S13, step S15, or step S16), the processor 11 determines the size obtained by subtracting the determined receive buffer size from the total buffer size to be the transmit buffer size (step S17).

When the receive buffer size and the transmit buffer size are determined based on the designated receive buffer size, the processor 11 updates various types of setting information stored in the RAM 12. That is, the processor 11 updates the receive buffer size stored in the region 31 of the RAM 12 to the determined receive buffer size (step S18). Also, the processor 11 updates the transmit buffer size stored in the region 32 of the RAM 12 to the determined transmit buffer size (step S19). Moreover, the processor 11 updates information indicating the position of the receive buffer in the RAM 12 in accordance with the updated receive buffer size (step S20). Also, the processor 11 updates information indicating the position of the transmit buffer in the RAM 12 in accordance with the updated transmit buffer size (step S21). Accordingly, the receive buffer and the transmit buffer are set.

Upon updating various types of setting information stored in the RAM 12, the processor 11 creates and transmits response data indicating the receive buffer size and the transmit/receive buffer size to the IC card processing apparatus 2 (step S22). For example, if the IC card 1 is a contact IC card, the IC card 1 transmits the receive buffer size and the transmit buffer size to the IC card processing apparatus 2 using response data as shown in FIG. 7 in response to the request from by the IC card processing apparatus 2 in the initial response processing. If the IC card 1 is a contactless IC card, the IC card 1 transmits the receive buffer size and the transmit buffer size to the IC card processing apparatus 2 using response data as shown in FIG. 9 in response to the request from the IC card processing apparatus 2 in the anti-collision processing. Furthermore, the IC card 1 transmits the receive buffer size and the transmit buffer size to the IC card processing apparatus 2 using response data as shown in FIG. 11 in response to the buffer size change command during the execution of an application.

Next, data communication processing including buffer size set (change) processing in the IC card 1 in an IC card processing system according to the embodiment will be described.

The IC card 1 according to the present embodiment performs buffer size set (change) processing in accordance with the buffer size change command from the IC card processing apparatus 2 during the execution of an application. That is, the processor 11 of the IC card 1 has the function of negotiating the buffer size with the IC card processing apparatus 2 in the application layer. In contrast, the controller 21 of the IC card processing apparatus 2 has the function of controlling data communication in accordance with the transmit buffer size and the receive buffer size of the IC card 1 and the function of requesting the IC card 1 to change the buffer size (the function of negotiating the buffer size) in accordance with the size of transmission and reception data produced during the execution of an application.

Figure 13:
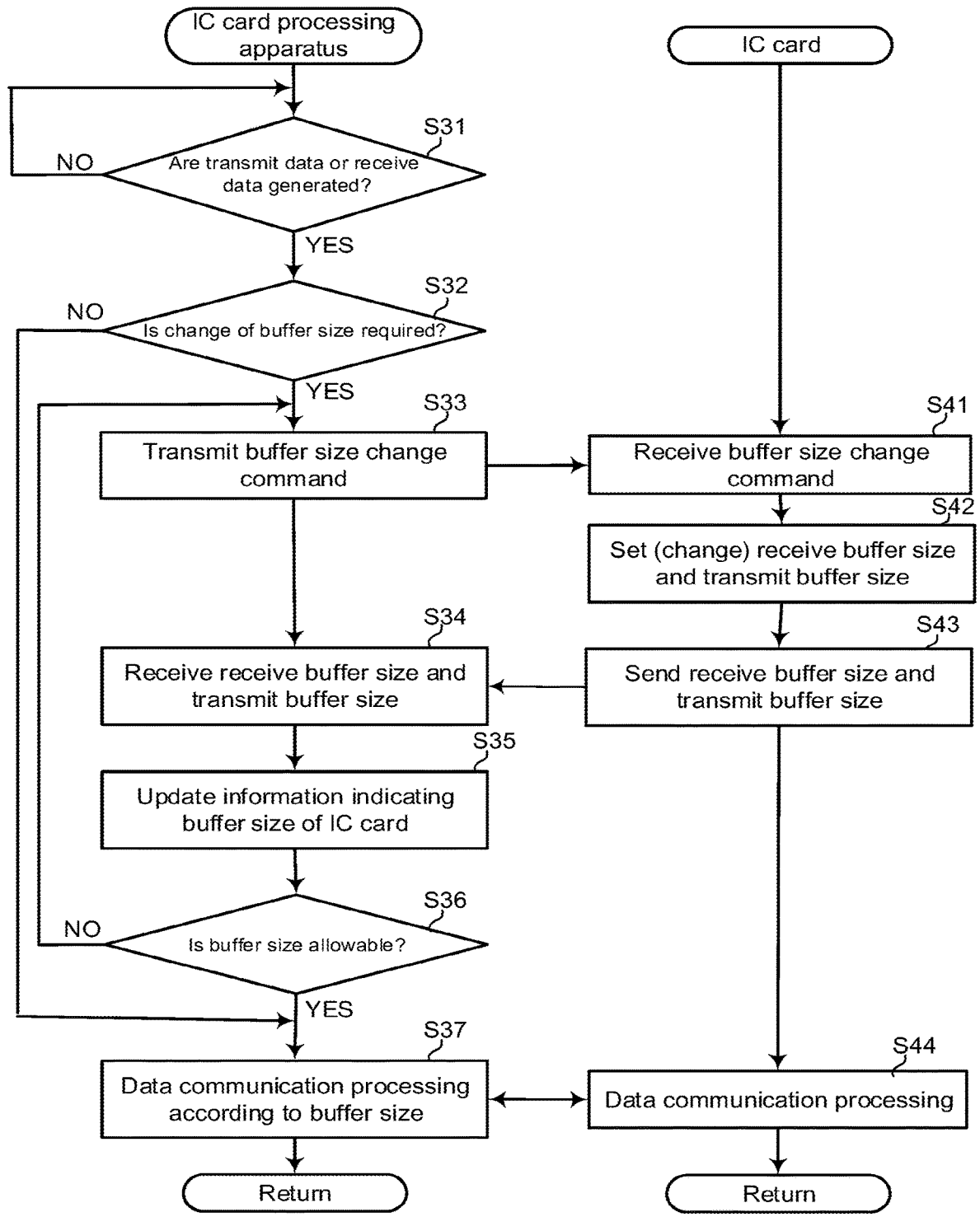
FIG. 13 is a diagram for illustrating the flow of data communication processing in an IC card processing system according to the embodiment.

FIG. 13 is a diagram for illustrating the flow of the data communication processing including the buffer size set (change) processing in the IC card processing system.

In the IC card processing apparatus 2, in the initial response processing or the anti-collision processing, for example, the RAM 26 or the nonvolatile memory 28 stores information indicating the receive buffer size and the transmit buffer size that are set by the IC card.

When transmission data or reception data is produced during the execution of processing by an application handling the IC card (step S31, YES), the controller 21 of the IC card processing apparatus 2 determines whether or not to change the receive buffer size and the transmit buffer size of the IC card (step S32). If it is determined not to change the receive buffer size and the transmit buffer size of the IC card (step S32, NO), the controller 21 executes data communication in accordance with the receive buffer size and the transmit buffer size of the current IC card (step S37).

Also, if it is determined to change the receive buffer size and the transmit buffer size of the IC card (step S32, YES), the controller 21 determines the receive buffer size (or the transmit buffer size) that is to be requested with respect to the IC card 1 in accordance with the size of transmission data or reception data. In the following description, an example will be described in which the IC card processing apparatus 2 notifies the IC card of the designation of the receive buffer size. When the receive buffer size that is to be requested with respect to the IC card is determined, the controller 21 generates a buffer size change command for designating the determined receive buffer size. Upon generating the buffer size change command, the controller 21 transmits the generated buffer change command to the IC card 1 (step S33).

When the IC card processing apparatus 2 transmits the buffer change command, the processor 11 of the IC card 1 receives this buffer size change command via the interface 16 and the communication controller 15 (step S41). Upon receiving the buffer size change command, the processor 11 sets the receive buffer and the transmit buffer corresponding to the buffer size change command through buffer size set processing as shown in FIG. 12 (step S42). Upon setting the receive buffer and the transmit buffer, the processor 11 transmits response data indicating the set receive buffer size and transmit buffer size to the IC card processing apparatus 2 (step S43).

When the IC card 1 transmits response data, the controller 21 of the IC card processing apparatus 2 receives the response data via the card reader/writer 24 (step S34). Upon receiving the response data from the IC card 1, the controller 21 updates information indicating the receive buffer size and transmit buffer size that are set in the IC card 1 (step S35). Also, if the controller 21 receives the response data from the IC card 1, the controller 21 determines whether or not, the receive buffer size and the transmit buffer size that are set in the IC card 1 are in an allowable range (step S36). If the receive buffer size and the transmit buffer size that are set by the IC card 1 are not in the allowable range, the controller 21 returns to step S33 mentioned above, generates a buffer size change command again, and transmits the generated buffer size change command to the IC card 1.

If it is determined that the receive buffer size and the transmit buffer size that are set by the IC card 1 are in the allowable range (step S36, YES), the controller 21 assumes that negotiation has been settled and performs data communication processing with consideration for the receive buffer size and the transmit buffer size that are set by the IC card 1 (step S37). In response to such data communication processing, the IC card 1 executes the data communication processing (command processing) using the set receive buffer and transmit buffer (step S44).

According to the above-described processing, it is possible to change the receive buffer size and the transmit buffer size of the IC card in accordance with the size of data that the IC card processing apparatus 2 transmits or receives while the IC card executes an application. That is, with the IC card 1, it is possible to change the buffer size in accordance with the buffer size change command from the IC card processing apparatus 2 in the application layer.

The case where the IC card processing apparatus 2 wants to transmit data having a large size to the IC card 1 using a write command will be described as a specific example of the above-described processing.

If the IC card processing apparatus 2 wants to transmit data having a large size to the IC card 1 using a write command, the IC card processing apparatus 2 requests the IC card to increase the size of the receive buffer of the IC card 1. That is, the IC card processing apparatus 2 creates a buffer size change command in which a large receive buffer size corresponding to the size of data to be transmitted is designated. In this case, in the buffer size change command, the IC card processing apparatus 2 may designate that the receive buffer has the maximum size or may also causes the IC card to set the maximum receive buffer size by setting the maximum value that is settable.

The IC card 1 sets the receive buffer having a large size based on the receive buffer size that is designated by the buffer size change command from the IC card processing apparatus 2. For example, if the receive buffer size designated by the buffer size change command is a size in a range in which the minimum transmit buffer can be secured, the processor 11 of the IC card 1 sets the receive buffer having the designated size. Also, if a size that exceeds the settable maximum receive buffer size is designated by the buffer size change command, or if it is designated that the receive buffer has the maximum size, the processor 11 of the IC card 1 secures the minimum transmit buffer and sets the receive buffer size to the maximum size in the transmit/receive buffer 36.

The IC card 1 notifies the IC card processing apparatus 2 of the receive buffer size and the transmit buffer size as the response to the buffer size change command. If the receive buffer size and the transmit buffer size of which the IC card processing apparatus 2 is notified by the IC card 1 are allowable, the IC card processing apparatus 2 starts data communication assuming that negotiation has been settled. Accordingly, the receive buffer size of the IC card increases, and thus the IC card processing apparatus 2 can transmit, to the IC card 1, data having a large size that will fit into the receive buffer that has been set (changed) to a larger size in transmission processing performed once.

Also, the case where the IC card processing apparatus 2 wants to receive data having a large size from the IC card 1 using a read command (the case where the IC card processing apparatus 2 wants to transmit data having a large size from the IC card) will be described as another specific example.

If the IC card processing apparatus 2 wants to receive data having a large size from the IC card using a read command, the IC card processing apparatus 2 requests the IC card to reduce the receive buffer size of the IC card (that is to say, to increase the transmit buffer size of the IC card 1). That is, the IC card processing apparatus 2 creates a buffer size change command that designates a receive buffer size having a small size so as to achieve the transmit buffer size having a large size corresponding to the size of data to be received. In this case, in the buffer size change command, the IC card processing apparatus 2 may designate that the receive buffer has the minimum size or may also cause the IC card to set the minimum receive buffer size by setting the minimum value that is settable.

The IC card 1 sets a receive buffer having a small size based on the receive buffer size designated by the buffer size change command received from the IC card processing apparatus 2, and sets a transmit buffer having a large size. For example, if the receive buffer size designated by the buffer size change command is larger than the minimum receive buffer, the processor 11 of the IC card 1 sets a receive buffer having the designated size. Moreover, if the receive buffer size that is less than or equal to the minimum receive buffer size is designated by the buffer size change command, or if it is designated that the receive buffer has the minimum size, the processor 11 of the IC card 1 sets the receive buffer size to the minimum receive buffer size, and sets the transmit buffer size to the maximum size in the transmit/receive buffer 36.

The IC card 1 notifies the IC card processing apparatus 2 of the receive buffer size and the transmit buffer size as the response to the buffer size change command. If the receive buffer size and the transmit buffer size of which the IC card processing apparatus 2 is notified by the IC card 1 are allowable, the IC card processing apparatus 2 starts data communication assuming that negotiation has been settled. Accordingly, because the transmit buffer size increases, the IC card processing apparatus 2 can receive data having a large size from the IC card 1 in receiving processing performed once. Although an example in which the IC card processing apparatus 2 notifies the IC card of designation of the receive buffer size was described above, the IC card processing apparatus 2 can also notify the IC card to designate the transmit buffer size.

According to the above-described embodiment, the IC card accepts designation of the receive buffer size or the transmit buffer size of the IC card from the IC card processing apparatus, the IC card sets the receive buffer size and the transmit buffer size in the communication buffer based on the receive buffer size or the transmit buffer size designated by the IC card processing apparatus, and responds to the IC card processing apparatus with the set receive buffer size and transmit buffer size.

Accordingly, the IC card can optimize the receive buffer size and the transmit buffer size based on the buffer size designated by the IC card processing apparatus. Also, even if the communication buffer in the IC card has a fixed size, it is possible to change the receive buffer size and the transmit buffer size based on the buffer size designated by the IC card processing apparatus, and to contribute to effective use of the memory region.

Also, if the IC card according to the embodiment is a contact IC card, the IC card can set the receive buffer size and the transmit buffer size based on the buffer size designated by the IC card processing apparatus in the processing of initial response to the IC card processing apparatus. Also, if the IC card according to the embodiment is a contactless IC card, the IC card can set the receive buffer size and the transmit buffer size based on the buffer size designated by the IC card processing apparatus in the anti-collision processing with the IC card processing apparatus.

Furthermore, if the IC card according to the embodiment receives the buffer size change command requesting the IC card to change the buffer size during the execution of an application, the IC card re-sets (changes) the receive buffer size and the transmit buffer size based on the buffer size designated by this buffer size change command. Accordingly, according to the present embodiment, the IC card can change the buffer size even in the application layer. As a result, it is possible to re-set the receive buffer size and the transmit buffer size in accordance with the size of data that is to be transmitted or received during application processing, and to realize the optimization of application processing.

Note that the functions described in the above-described embodiments are not only constituted using hardware but also can be realized by causing a computer to read programs in which the functions are written, using software. The functions may also be constituted by selecting either software or hardware as appropriate.

While certain embodiments of the present invention have been described, these embodiments have been presented by way of example only, and are not intended to limit the scope of the invention. The novel embodiments described herein may be embodied in a variety of other forms, and various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An integrated circuit (IC) card comprising:
   a communication circuitry that includes a communication controller and an interface, and that communicates with an external apparatus;
   a storage in which a communication buffer for communication between the communication circuitry and the external apparatus is set; and
   a processor that, if a buffer size that is to be used in communication is designated by the external apparatus, sets a first size of a receive buffer that stores reception data and a second size of a transmit buffer that stores transmission data in the communication buffer, and notifies the external apparatus of the first size of the receive buffer and the second size of the transmit buffer,
   wherein the interface is configured to perform contact communication, and
   the processor sets the receive buffer and the transmit buffer based on the buffer size designated by the external apparatus in initial response processing of the contact communication with the external apparatus, and notifies the external apparatus of the first size of the receive buffer and the second size of the transmit buffer.

2. The IC card according to claim 1,
   wherein the interface is configured to perform contactless communication, and
   the processor sets the receive buffer and the transmit buffer based on the buffer size designated by the external apparatus in anti-collision processing of the contactless communication with the external apparatus, and notifies the external apparatus of the first size of the receive buffer and the second size of the transmit buffer.

3. The IC card according to claim 1,
   wherein the processor sets the receive buffer and the transmit buffer by changing allocation of the receive buffer and the transmit buffer in the communication buffer.

4. The IC card according to claim 1,
   wherein the communication buffer has a fixed size.

5. The IC card according to claim 1,
   wherein the processor sets the size of the receive buffer and the size of the transmit buffer based on the buffer size designated by the external apparatus.

6. The IC card according to claim 1 comprising:
   a module having the communication circuitry, the storage, and the processor; and
   a main body having the module.

7. An integrated circuit (IC) card comprising:
a communication circuitry that includes a communication controller and an interface, and that communicates with an external apparatus;
a storage in which a communication buffer for communication between the communication circuitry and the external apparatus is set; and
a processor that, if a buffer size that is to be used in communication is designated by the external apparatus, sets a first size of a receive buffer that stores reception data and a second size of a transmit buffer that stores transmission data in the communication buffer, and notifies the external apparatus of the first size of the receive buffer and the second size of the transmit buffer,
wherein the processor has a function of executing an application, and if the processor receives a command requesting the processor to change the buffer size during execution of the application, sets the receive buffer and the transmit buffer based on the buffer size designated by the command, and notifies the external apparatus of the first size of the receive buffer and the second size of the transmit buffer.

8. The IC card according to claim 7,
wherein the processor sets the receive buffer and the transmit buffer by changing allocation of the receive buffer and the transmit buffer in the communication buffer.

9. The IC card according to claim 7, wherein the communication buffer has a fixed size.

10. An integrated circuit (IC) card comprising:
a communication circuitry that includes a communication controller and an interface, and that communicates with an external apparatus;
a storage in which a communication buffer for communication between the communication circuitry and the external apparatus is set; and
a processor that, if a buffer size that is to be used in communication is designated by the external apparatus, sets a first size of a receive buffer that stores reception data and a second size of a transmit buffer that stores transmission data in the communication buffer, and notifies the external apparatus of the first size of the receive buffer and the second size of the transmit buffer,
wherein the processor, if the buffer size designated by the external apparatus is smaller than a minimum receive buffer size, sets the receive buffer to the minimum receive buffer size, and if a size obtained by subtracting the buffer size designated by the external apparatus from a size of the communication buffer is smaller than a minimum transmit buffer size, sets the transmit buffer to the minimum transmit buffer size.

11. The IC card according to claim 10,
wherein the minimum receive buffer size is a setting value indicating a minimum size that can be set as the first size of the receive buffer, and the minimum transmit buffer size is a setting value indicating a minimum size that can be set as the second size of the transmit buffer.

12. The IC card according to claim 11,
wherein the minimum receive buffer size and the minimum transmit buffer size are setting values that cannot be changed.

13. The IC card according to claim 10, wherein the communication buffer has a fixed size.

* * * * *